US008500945B2

(12) United States Patent
Brown

(10) Patent No.: US 8,500,945 B2
(45) Date of Patent: Aug. 6, 2013

(54) FRAMING CORNER JOINT AND METHOD OF MANUFACTURE

(75) Inventor: Randy J. Brown, Puyallup, WA (US)

(73) Assignee: Milgard Manufacturing Incorporated, Tacoma, WA (US)

( * ) Notice: Subject to any disclaimer, the term of this patent is extended or adjusted under 35 U.S.C. 154(b) by 182 days.

(21) Appl. No.: 13/017,644

(22) Filed: Jan. 31, 2011

(65) Prior Publication Data
US 2011/0123755 A1 May 26, 2011

Related U.S. Application Data

(62) Division of application No. 11/397,290, filed on Apr. 4, 2006.

(51) Int. Cl.
*B32B 37/04* (2006.01)
*E06B 3/964* (2006.01)
*E06B 3/968* (2006.01)

(52) U.S. Cl.
USPC .............. 156/304.2; 156/304.3; 156/304.6; 156/309.6; 29/469; 428/58; 160/381

(58) Field of Classification Search
USPC ............ 156/304.2, 304.3, 304.6, 158, 309.6, 156/309.9, 503; 29/469; 160/381; 428/58
See application file for complete search history.

(56) References Cited

U.S. PATENT DOCUMENTS

| | | | |
|---|---|---|---|
| 3,928,100 A | * | 12/1975 | Heuschen et al. .............. 156/92 |
| 4,027,987 A | | 6/1977 | Berkowitz |
| 4,077,160 A | * | 3/1978 | Stewart ........................... 49/421 |
| 4,390,578 A | | 6/1983 | Brooks |
| 4,452,138 A | | 6/1984 | Bubley et al. |
| 4,752,350 A | | 6/1988 | Schuster |
| 4,995,213 A | | 2/1991 | Bezubic |
| 5,010,708 A | * | 4/1991 | Evans et al. ................. 52/656.9 |
| 5,015,117 A | | 5/1991 | Pawlicki |
| 5,786,054 A | | 7/1998 | Platusich et al. |
| 5,902,657 A | | 5/1999 | Hanson et al. |

(Continued)

FOREIGN PATENT DOCUMENTS

DE  198 18 632 A1  11/1999
DE  298 20 574 U1  12/1999

(Continued)

OTHER PUBLICATIONS

International Search Report and Written Opinion, International Application No. PCT/US2007/006797, International Filing Date—Mar. 15, 2007, Mailing Date—Jan. 10, 2007, 13 pages.

*Primary Examiner* — Mark A Osele
(74) *Attorney, Agent, or Firm* — Reising Ethington PC

(57) ABSTRACT

A framing corner joint includes first and second framing rails of fiberglass-reinforced resin construction. The first and second framing rails have hollow mitered ends. A pair of thermoplastic plugs are received in the mitered ends of the respective framing rails. Each of the plugs includes a body inserted into the hollow interior of an associated framing rail and a flat plug flange at an angle of 45° to the body. The plug flanges extend outwardly from the peripheries of the bodies between the rail ends and have flat end faces that are bonded to each other. The bodies of the plugs preferably are hollow, and preferably are received by interference press-fit within the ends of the rails. The plug flanges of the plugs preferably are welded to each other.

15 Claims, 3 Drawing Sheets

U.S. PATENT DOCUMENTS

| | | |
|---|---|---|
| 5,918,392 A | 7/1999 | Bates |
| 6,056,033 A | 5/2000 | Schwaiger |
| 6,103,035 A | 8/2000 | Hanson et al. |
| 6,119,752 A | 9/2000 | Zollinger et al. |
| 6,273,988 B1 | 8/2001 | Zollinger et al. |
| 6,490,839 B1 | 12/2002 | Macquart et al. |
| 6,503,020 B1 | 1/2003 | Mascioletti et al. |
| 6,588,334 B2 | 7/2003 | Salisbury |
| 6,609,349 B2 | 8/2003 | Davidsaver |
| 6,619,003 B2 | 9/2003 | Von Arx et al. |
| 6,746,175 B1 | 6/2004 | Gonneman et al. |
| 6,875,305 B2 | 4/2005 | Tesch |
| 2001/0010779 A1 | 8/2001 | Pfister |
| 2001/0014250 A1 | 8/2001 | Plummer et al. |
| 2004/0108040 A1 | 6/2004 | Field et al. |
| 2004/0231283 A1 | 11/2004 | LaSusa |

FOREIGN PATENT DOCUMENTS

| | | |
|---|---|---|
| EP | 0 036 286 A1 | 9/1981 |
| EP | 0 255 510 A1 | 2/1988 |
| EP | 0 288 756 A1 | 11/1988 |
| EP | 1 054 130 A2 | 11/2000 |
| GB | 1443953 A | 7/1976 |
| GB | 2290573 A * | 1/1996 |

* cited by examiner

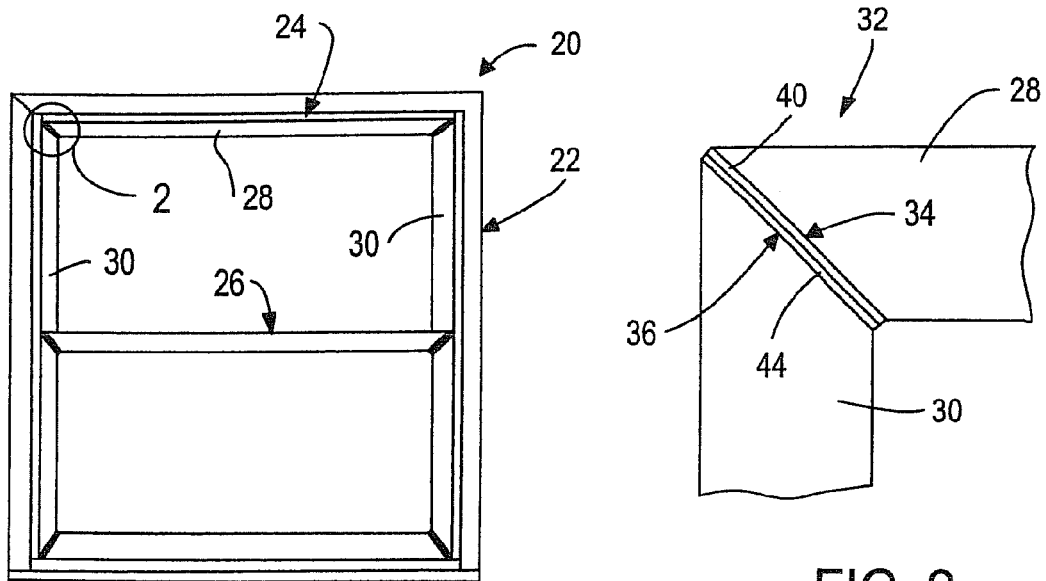
FIG. 1
FIG. 2
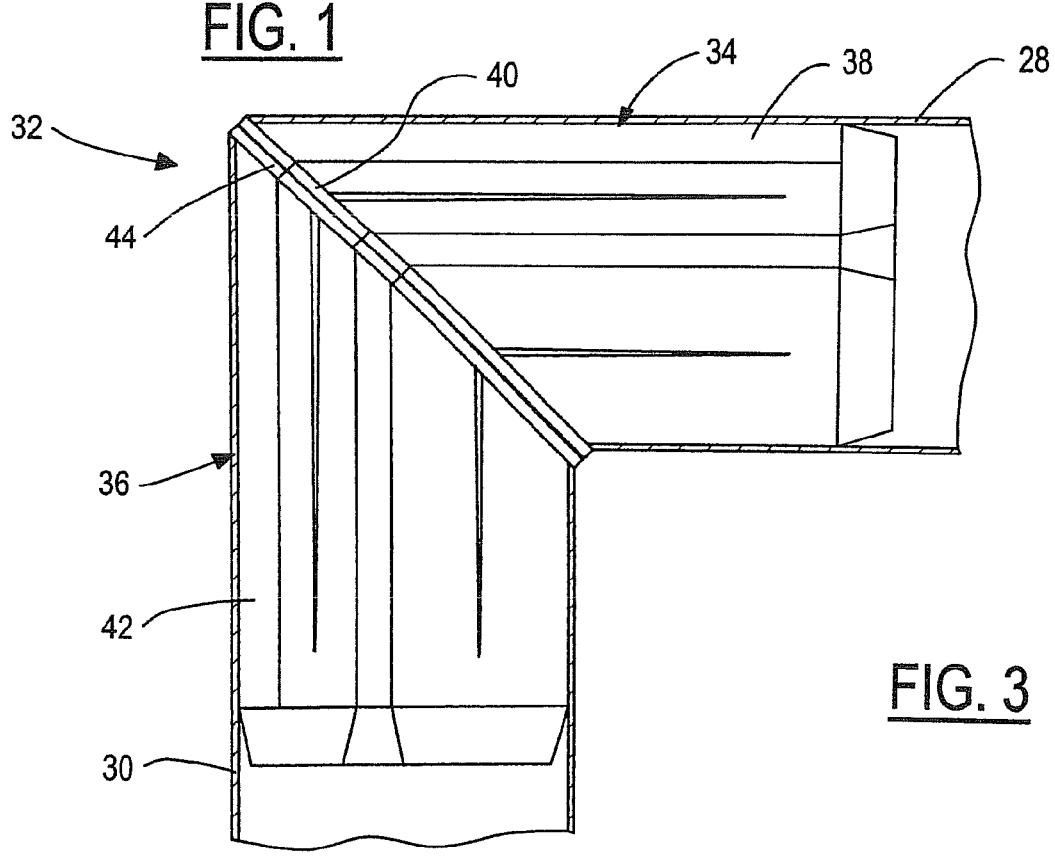
FIG. 3

FRAMING CORNER JOINT AND METHOD OF MANUFACTURE

CROSS-REFERENCE TO RELATED APPLICATION

This application is a divisional of U.S. patent application Ser. No. 11/397,290 filed on Apr. 4, 2006. The disclosures of the above application is incorporated herein by reference in its entirety.

The present disclosure relates to corner joints in framing structures for windows and/or doors for example, and to a method of making such a corner joint.

BACKGROUND AND SUMMARY OF THE DISCLOSURE

When joining the ends of lineal rails at the corners of structural sash and framing members of building windows, for example, the mitered corners of the lineal rails can be thermally welded to each other when the rails are of vinyl construction. Fiberglass-reinforced composite rails have many advantages over vinyl, but cannot readily be welded to each other. Mechanical joining has been used, increasing the cost of the framing corner and/or deleteriously affecting the sealing properties of the corner joint. One objective of the present disclosure is to provide the ability to weld the corners of a fiberglass-reinforced composite window or door framing to obtain the sealing benefits of a welded joint while retaining other benefits of using fiberglass-reinforced composites.

The present disclosure involves a number of aspects that can be implemented separately from or in combination with each other.

A framing corner joint in accordance with one aspect of the present disclosure includes first and second framing rails of fiberglass-reinforced resin construction. The first and second framing rails have hollow mitered ends. A pair of thermoplastic plugs are received in the mitered ends of the respective framing rails. Each of the plugs includes a body inserted into the hollow interior of an associated framing rail and a flat end wall at an angle of 45° to the body. The end walls extend outwardly from the peripheries of the bodies between the rail ends and have flat end faces that are bonded to each other. The bodies of the plugs preferably are hollow, and preferably are received by interference press-fit within the ends of the rails. Once inserted, the flanges of the two plugs preferably are welded to each other to join that corner of the framing member.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a front elevational view of a framing structure in accordance with one exemplary embodiment of the present disclosure;

FIG. 2 is a fragmentary elevational view on an enlarged scale of the portion of FIG. 1 within the area 2;

FIG. 3 is a sectional view on an enlarged scale of the corner joint illustrated in FIG. 2;

DETAILED DESCRIPTION OF PREFERRED EMBODIMENTS

Figure 4:
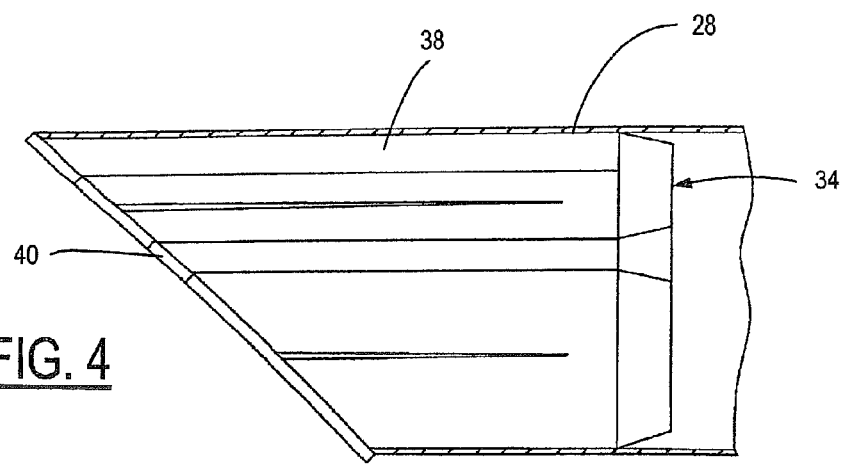
FIG. 4 is a sectional view of the upper rail in FIG. 2 having the plug inserted therein.

FIG. 1 illustrates a building window assembly 20 in accordance with one exemplary embodiment of the present disclosure. Window assembly 20 includes an outer framing 22 that presents one type of framing structure, an upper sash 24 that presents another type of framing structure, and a lower sash 26 that presents a framing structure similar to upper sash 24. Upper sash 24 includes upper and lower framing rails 28 and framing sides rails 30. Lower sash 26 may be of similar construction. Framing rails 28,30 are of elongated fiberglass-reinforced resin construction having interiors of predetermined geometry and mitered ends at angles of 45° where the rails are joined to each other. At least the ends of the rails are open and hollow. The central portions of the rails may be hollow, or may be filled with insulating material such as polyurethane foam. The interiors of the rails are mirror images of each other at each corner.

Figure 5:
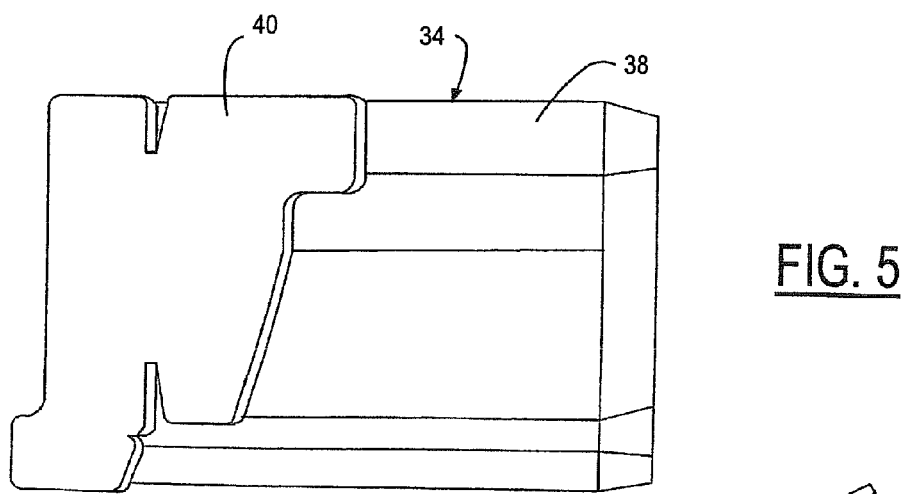
FIGS. 5-8 are views of the plug illustrated in FIG. 4.
Figure 6:
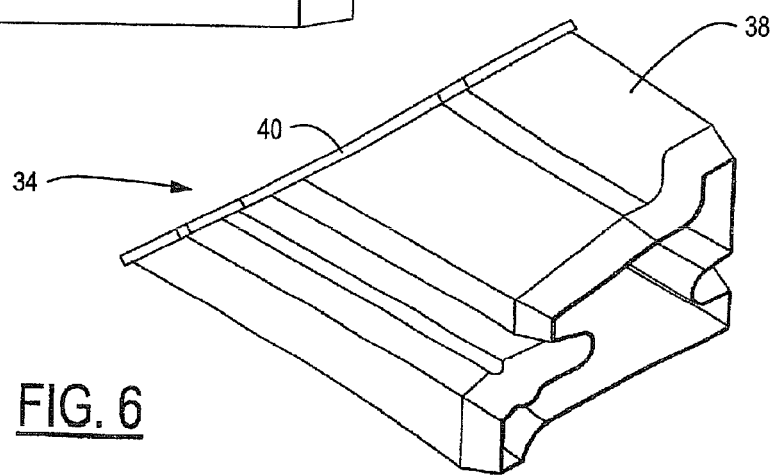
Figure 7:
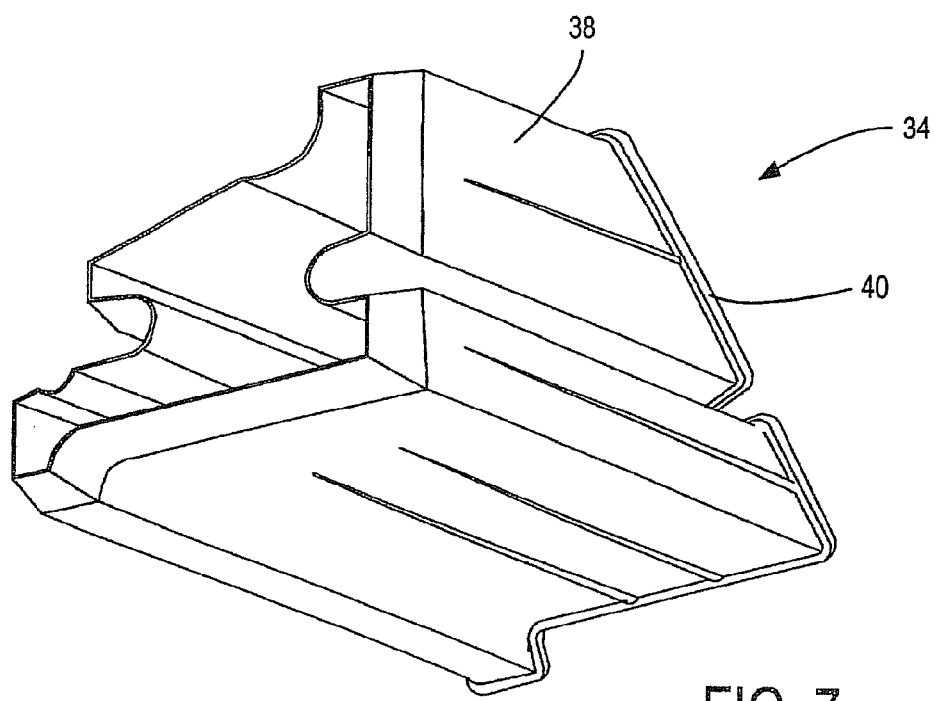
Figure 8:
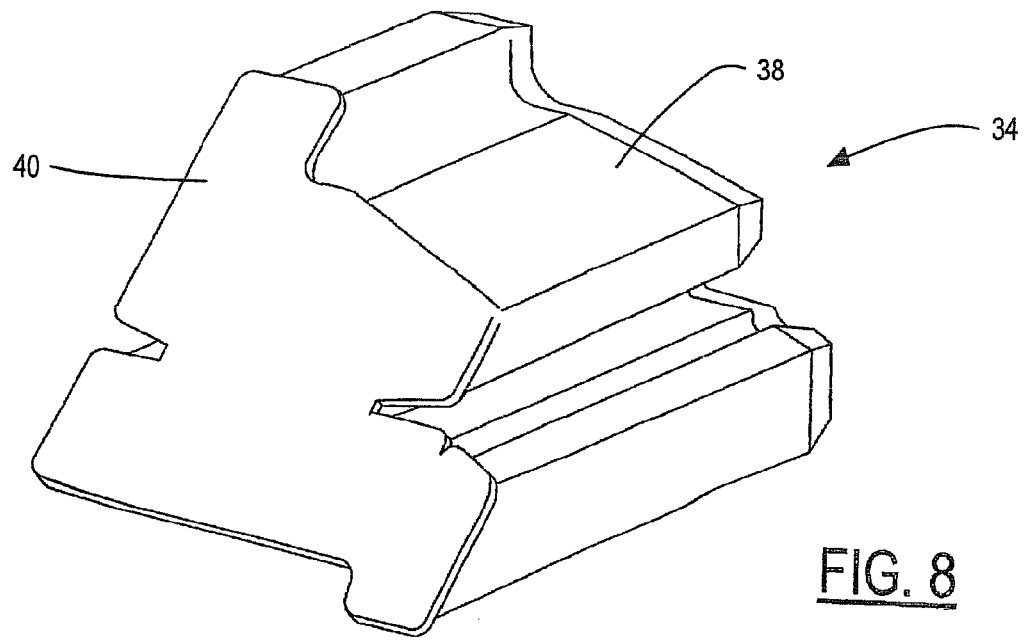

FIGS. 2 and 3 illustrate a framing corner joint 32 in accordance with an exemplary embodiment of the present disclosure where an upper rail 28 is joined to a side rail 30. A first plug 34 is assembled to the mitered end of rail 28, and a second plug 36 is assembled to the mitered end of rail 30. Plug 34 has a body 38, which preferably is hollow to reduce cost and is received within the hollow mitered end of rail 28. An end wall 40 closes one end of hollow body 38 and is disposed at an angle of 45° to the axis of body 38. End wall 40 preferably is imperforate for strength and rigidity, as best seen in FIGS. 5 and 8, although perforations or openings could be provided without departing from the present disclosure in its broadest aspects. End wall 40 preferably extends outwardly from the periphery of body 38 to form a lip or flange that overlies and abuts the end of rail 28 when plug 34 is fully inserted into the end of the rail, as best seen in FIG. 4. The flange on the plug provides a positive stop for the insertion of the plug into the rail, although it is possible to insert the plug to the proper distance without the flange. In addition, the flange provides more surface area for a bond between the rail members and excess material to assure a seal between the rail members, although it is possible to butt weld the plugs with just the edges of the plug walls and this can provide enough excess material to provide the seal between the two rail members. Body 38 has a peripheral contour that corresponds with the predetermined interior contour of rail 28, and preferably is received by interference press-fit within the interior of rail 28. Adhesive or another suitable bonding or sealing agent may be applied to the outer surface of plug body 38 before the plug body is press-fitted into the interior of rail 28. The periphery of end wall 40 preferably follows the periphery of body 38 but extends radially outwardly therefrom so as to overlie and abut the end of rail 28 as previously described.

Plug 36 (FIG. 3) has a construction that is a mirror image of plug 34, with a hollow body 42 received within the interior of rail 30 and an end wall 44 that closes the end of hollow body 42. For simple rail geometries, plugs 34, 36 may be identical. For more complex rail geometries of the type illustrated in the drawings, plugs 34, 36 are non-identical but are mirror images of each other along the planes of end walls 40, 44. The geometry of plug 34 illustrated in FIGS. 5-8 for example, accommodates strengthening ribs on the inside of the rail. The periphery of end wall 40 follows the periphery of body 38 with a slight radial flange or lip that corresponds to the thickness of the rail wall. Plugs 34, 36 are of respective one-piece thermoplastic constructions such as PVC, polyurethane or other weldable thermoplastic material.

After the plugs 34, 36 have been inserted into the respective rails 28, 30, the end walls 40, 44 of plugs 34, 36 are welded or otherwise secured to each other. This may be carried out by thermal or solvent welding, for example. During this welding operation, the framing ends are held tightly against each other. The flange portions of end walls 40,44 that overlie the ends of the respective rails are sources of excess material that can be pushed into the seam to create pressure to improve the bond around the insides of the respective rails. This excess material can also be pushed outside of the seam to create a watertight seal at the seam. Such excess material is preferred to help assure a good seal and tight bond to the framing rail, with excess material possibly being pushed to the outside of the respective rails and trimmed after the welding operation. Thermoplastic material will be exposed between the ends of the respective rails, but will be as thin as possible depending on the accuracy of the mitered cuts and the squareness of the assembly. The thermoplastic material will fill the gaps between the rail members and is desired to be as thin as possible and preferably less than 0.010". The preferred embodiment would be where the mitered corners are cut perfectly and assembled squarely, and all of the thermoplastic material is squeezed out from the joint leaving only a minuscule bond layer.

There thus have been disclosed a framing corner joint and a method of making a framing corner joint that fully satisfy all of the objects and aims previously set forth. The disclosure has been presented in conjunction with an exemplary embodiment, and a number of additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of manufacturing, which includes the steps of:
   (a) providing framing rails composed of a fiberglass-reinforced material and having mitered ends that are open and hollow with interior contours;
   (b) assembling to said mitered ends of said framing rails, plugs composed of a weldable thermoplastic material different from said fiberglass-reinforced material of said framing rails, said plugs having hollow bodies with peripheral contours corresponding with said interior contours of said framing rails and having end walls with radially outwardly extending flanges, wherein said bodies of said plugs are press fit into said mitered ends of said framing rails so that said peripheral contours of said bodies are interference fit to said interior contours of said framing rails and so that said end wall flanges of said plugs overlie and abut said mitered ends of said framing rails, and
   (c) welding said end walls of said plugs to each other, wherein said flanges of said plugs are sources of excess material pushed inside a seam between said plugs to assure a tight bond to said framing rails and of excess material pushed outside the seam to create a watertight seal.

2. A product produced by the method recited in claim 1.

3. The method set forth in claim 1 wherein said plugs are of constructions that are mirror images of each other.

4. The method set forth in claim 1 wherein said end walls are disposed at angles of 45 degrees to said bodies.

5. The method set forth in claim 4 wherein said end wall flanges have peripheries that follow said peripheral contours of said bodies.

6. The method set forth in claim 1 including a sealing or bonding agent between said plug bodies and interior surfaces of said rails.

7. The method set forth in claim 1 wherein said end walls are welded to each other.

8. The method set forth in claim 7 wherein said end walls are imperforate.

9. The method set forth in claim 1 wherein said peripheral contours of said bodies are in direct contact with said interior contours of said framing rails, without reinforcing inserts therebetween.

10. The method set forth in claim 9 wherein said plugs are assembled to said framing rails without using a cam fastening element.

11. A method of joining mitered ends of fiberglass-reinforced framing rails, which includes the steps of:
   (a) providing a pair of plugs, each of said plugs having a body and an end wall at an angle of 45° to said body, said plugs being of weldable thermoplastic construction different from said fiberglass-reinforced framing rails and of geometries that are mirror images of each other, said end wall having a radially outwardly extending flange,
   (b) press fitting said bodies of said plugs into mitered ends of said rails so that said end walls of said plugs overlie and abut said mitered ends of said rails, and
   (c) welding said end walls to each other wherein said flanges of said plugs are sources of excess material pushed inside a seam between said plugs to assure a tight bond to said framing rails and of excess material pushed outside the seam to create a watertight seal.

12. The method set forth in claim 11 including applying a bonding agent to said bodies prior to said step (b).

13. A product produced by the method recited in claim 11.

14. The method set forth in claim 11 wherein said bodies of said plugs are in direct contact with said mitered ends of said rails without reinforcing inserts therebetween.

15. The method set forth in claim 11 wherein said plugs are assembled to said framing rails without using a cam fastening element.

* * * * *